(12) United States Patent
Matsubara et al.

(10) Patent No.: US 9,409,240 B2
(45) Date of Patent: Aug. 9, 2016

(54) INDEXABLE CUTTING TOOL

(71) Applicant: Sumitomo Electric Hardmetal Corp., Itami-shi, Hyogo (JP)

(72) Inventors: Kouki Matsubara, Itami (JP); Atsuhiko Maeta, Itami (JP); Shinya Imamura, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 206 days.

(21) Appl. No.: 14/370,119

(22) PCT Filed: Apr. 18, 2013

(86) PCT No.: PCT/JP2013/061451
§ 371 (c)(1),
(2) Date: Jul. 1, 2014

(87) PCT Pub. No.: WO2014/017133
PCT Pub. Date: Jan. 30, 2014

(65) Prior Publication Data
US 2014/0348600 A1 Nov. 27, 2014

(30) Foreign Application Priority Data
Jul. 24, 2012 (JP) .................. 2012-163673

(51) Int. Cl.
*B23C 5/00* (2006.01)
*B23C 5/22* (2006.01)
*B23C 5/06* (2006.01)
*B23C 5/20* (2006.01)

(52) U.S. Cl.
CPC . *B23C 5/06* (2013.01); *B23C 5/207* (2013.01); *B23C 5/22* (2013.01); *B23C 5/2221* (2013.01);
(Continued)

(58) Field of Classification Search
CPC ............... B23C 2200/045; B23C 2200/12; B23C 2200/121; B23C 2200/126; B23C 2200/128; B23C 2200/168
See application file for complete search history.

(56) References Cited

U.S. PATENT DOCUMENTS 6,004,081 A 12/1999 Hellstrom et al.
6,164,878 A * 12/2000 Satran ................. B23C 5/2221
407/102

(Continued)

FOREIGN PATENT DOCUMENTS

CN 1568240 A 1/2005
CN 1771104 A 5/2006
(Continued)

OTHER PUBLICATIONS

Oct. 23, 2015 Office Action issued in Chinese Patent Application No. 201380006550.8.
(Continued)

*Primary Examiner* — Will Fridie, Jr.
(74) *Attorney, Agent, or Firm* — Oliff PLC (57) ABSTRACT

A positioning section that positions a cutting edge, used in cutting, at an indexed point is provided at a portion of a round insert towards a bottom surface at a periphery of the round insert. A support seat, provided at a tool body, includes a first seat side surface, a second seat side surface, and a restraining section. The first seat side surface and the second seat side surface contact and support side surfaces of the round insert that are disposed 90 degrees apart from each other. The positioning section is fitted to the restraining section by bumpy portion fitting. Only one restraining section is provided. A second relief portion that is larger than a first relief portion is provided at a corner at a side of the second seat side surface.

5 Claims, 6 Drawing Sheets

(52) U.S. Cl.
CPC ..... *B23C 2200/045* (2013.01); *B23C 2200/121* (2013.01); *B23C 2200/128* (2013.01); *B23C 2200/165* (2013.01); *B23C 2200/167* (2013.01); *B23C 2200/168* (2013.01); *B23C 2210/168* (2013.01); *B23C 2210/244* (2013.01); *B23C 2210/50* (2013.01); *Y10T 407/20* (2015.01)

(56) References Cited

U.S. PATENT DOCUMENTS

| | | | |
|---|---|---|---|
| 6,238,133 | B1 | 5/2001 | DeRoche et al. |
| 2006/0245837 | A1* | 11/2006 | Dufour ............... B23C 5/06 409/132 |
| 2011/0103904 | A1 | 5/2011 | Dufour et al. |
| 2013/0195567 | A1* | 8/2013 | Sunnvius ............. B23C 5/06 407/40 |
| 2014/0086696 | A1* | 3/2014 | Fang ................... B23C 5/2221 407/99 |

FOREIGN PATENT DOCUMENTS

| | | |
|---|---|---|
| JP | A-2002-527251 | 8/2002 |
| JP | A-2006-523541 | 10/2006 |
| JP | A-2007-210090 | 8/2007 |
| JP | 2008155366 | 7/2008 |
| JP | A-2011-245585 | 12/2011 |
| JP | B2-4857958 | 1/2012 |
| WO | WO 00/23218 A1 | 4/2000 |
| WO | 03033195 A1 | 4/2003 |
| WO | WO 2004/094092 A1 | 11/2004 |

OTHER PUBLICATIONS

Apr. 18, 2016 Extend European Search Report issued in European Application No. 13822271.6.

May 21, 2013 International Search Report issued in International Application No. PCT/JP2013/061451.

* cited by examiner

INDEXABLE CUTTING TOOL

TECHNICAL FIELD

The present invention relates to an indexable cutting tool including a circular cutting insert (what is called a "round insert") that is mounted to a support seat provided at a tool body.

BACKGROUND ART

Regarding an indexable cutting toot in which a positive round insert and a tool body are combined, various structures for mounting the round insert to a support seat of the tool body are proposed.

A method that is disclosed in, for example, PTL 1 below is often used to mount a round insert to a tool body. In this method, the insert is positioned by contacting contact surfaces (restraining surfaces) with seat side surfaces provided in correspondence with a support seat of the tool body. The contact surfaces are formed at a constant pitch in a peripheral direction at a portion of the round insert towards a bottom surface at a periphery of the round insert by cutting portions of side surfaces of the round insert. Each contact surface is a flat surface having a tilt angle that is greater than that of the side surfaces.

In the cutting tool in PTL 1, nicks are also provided, along with the contact surfaces, at the periphery of the insert, and protrusions formed on the tool body enter the nicks. This structure is for preventing erroneous mounting of the insert. The positioning of the insert is performed by simultaneously pushing, among the plurality of restraining surfaces, two surfaces that are set at an angle of 90 degrees from each other against two seat side surfaces of the support seat.

CITATION LIST

Patent Literature

PTL 1: Japanese Patent No. 4857958

SUMMARY OF INVENTION

Technical Problem

In the above-described mounting structure in which the insert is restrained by contacting the flat contact surfaces, provided at the side surfaces of the insert, with the seat side surfaces of the support seat, it is difficult to increase positioning precision of the insert.

Since the contact surfaces are formed at portions of the insert towards the bottom surface at the periphery of the insert, contact area of in particular, a small insert with the seat side surfaces is small. In addition, since an unavoidable processing error occurs, it is very difficult to simultaneously closely contact two contact surfaces of the insert with two seat side surfaces of the tool body. Therefore, seating of the insert with respect to the support seat is poor, as a result of which precise positioning and stable securing of the insert cannot be expected.

In the structure in which the bottom surface side at the periphery of the insert is restrained, thinned portions that are provided at corners (where the seat bottom surface and the seat side surfaces intersect each other) of the support seat cannot be made large because the area of the seat side surfaces of the support seat needs to be ensured. Therefore, stress that concentrates at the corners is not sufficiently reduced.

In view of such a related art, it is an object of the present invention to make it possible to stably secure a round insert to a support seat with high precision and to reduce stress at corners of the support seat.

Solution to Problem

To this end, the present invention provides an indexable cutting tool including a positive round insert that is mounted to a support seat provided at a periphery of an end of a tool body. The cutting tool has the following structure. A positioning section that positions a cutting edge, used in cutting, at an indexed point (position of use) is provided at a portion of the round insert towards a bottom surface at a periphery of the round insert. The support seat includes a first seat side surface, a second seat side surface, and a restraining section. The first seat side surface and the second seat side surface contact and support side surfaces of the round insert that are disposed 90 degrees apart from each other. The positioning section of the round insert is fitted to the restraining section (5) by bumpy portion fitting. Only one restraining section is provided between the seat bottom surface and the first seat side surface of the support seat. A first relief portion is provided at a corner at a side of the first seat side surface, and a second relief portion that is larger than the first relief portion is provided at a corner at a side of the second seat side surface.

In such an indexable cutting tool, a specific example of the positioning section of the round insert may include recessed portions and ridges, which are alternately provided at a constant pitch in a peripheral direction at portions of the side surfaces towards the bottom surface of the round insert, each ridge having a constant width. In addition, the restraining section of the support seat may include a restraining flute and protrusions, the ridge engaging the restraining flute and the protrusions entering the recesses on two sides of the ridge.

The second relief portion may be formed in a range from the seat bottom surface to the second seat side surface of the support seat.

In comparison with a cutting tool of a type in which flat contact surfaces are provided at portions of a round insert towards the bottom surface at a periphery of the round insert and two contact surfaces are restrained by seat side surfaces, the cutting tool according to the present invention having the above-described structure can provide a wide contact area between the side surfaces of the round insert and the seat side surfaces of the support seat.

The first seat side surface and the second seat side surface of the support seat are concentrically disposed. Therefore, it is possible to prevent the occurrence of unavoidable processing errors when the flat contact surfaces are provided 90 degrees apart from each other. This makes it possible to increase positioning precision and more stably secure the insert.

The second relief portion can be made large by forming the second relief portion in a range extending from the seat bottom surface to the second seat side surface of the support seat. As a result, stress that is applied to the corner of the support seat at the side of the second seat side surface can be reduced by spreading the stress over a wide range. Although the size of the second relief portion depends upon the size of the round insert, the second relief portion is provided in a region whose size is greater than or equal to ⅓ times, desirably, ½ times the height (thickness between upper and lower surfaces) of the round insert.

A round insert is ordinarily secured to a tool body by fastening the insert as a result of passing a clamp screw through a mounting hole in the center of the round insert and driving the clamp screw into a threaded hole formed in the seat bottom surface of the support seat. The cutting tool according to the present invention is also secured by this method.

The positioning section (the recessed portion and ridge) that is provided at the round insert and the restraining section (the restraining flute and the protrusions) that is provided at the toot body are provided for the purpose of positioning the round insert at an indexed point. This purpose is also achieved by a structure in which the restraining section is provided between the seat bottom surface and the second seat side surface of the support seat. However, when the restraining section is provided between the seat bottom surface and the first seat side surface, the second relief portion is allowed to be formed at the side of the second seat side surface in a region extending from the seat bottom surface to the second seat side surface of the support seat.

The end of each protrusion, provided at the tool body, may engageably face a bottom of the corresponding recessed portion, provided in the round insert, and the round insert may be positioned at an indexed point at a location where the restraining flute and the ridge engage with each other and at a location where the end of each protrusion and the bottom of the corresponding recessed portion engage with each other. This structure makes it possible to more reliably prevent rotation of the round insert.

Advantageous Effects of Invention

In the cutting tool according to the present invention, the support seat that is provided at the tool body includes a first seat side surface and a second seat side surface. In addition, the insert is positioned and supported by causing side surfaces at the upper side of the round insert that are disposed 90 degrees apart from each other to contact the first and second seat side surfaces. Therefore, it is possible to increase positioning precision and more stably secure the insert.

In addition, since it is possible to increase the size of the second relief portion, it is possible to reduce stress that is applied to the corner of the support seat.

DESCRIPTION OF EMBODIMENT

An embodiment of an indexable cutting tool according to the present invention is hereunder described with reference to FIGS. 1 to 12 of the attached drawings.

Figure 1:
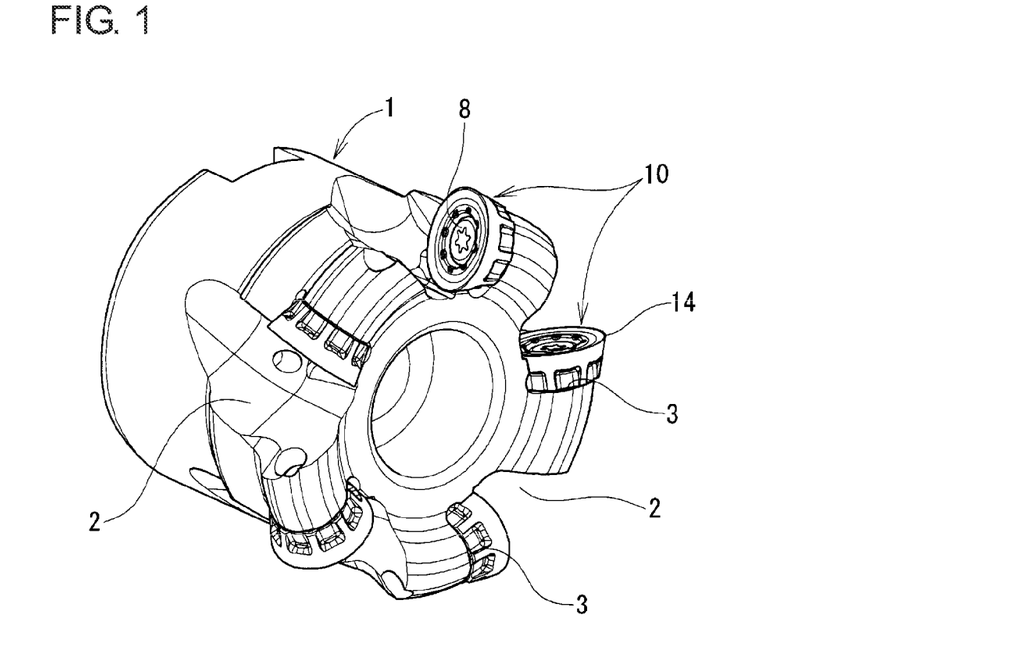
FIG. 1 is a perspective view of an indexable cutting tool according to an embodiment of the present invention.
Figure 2:
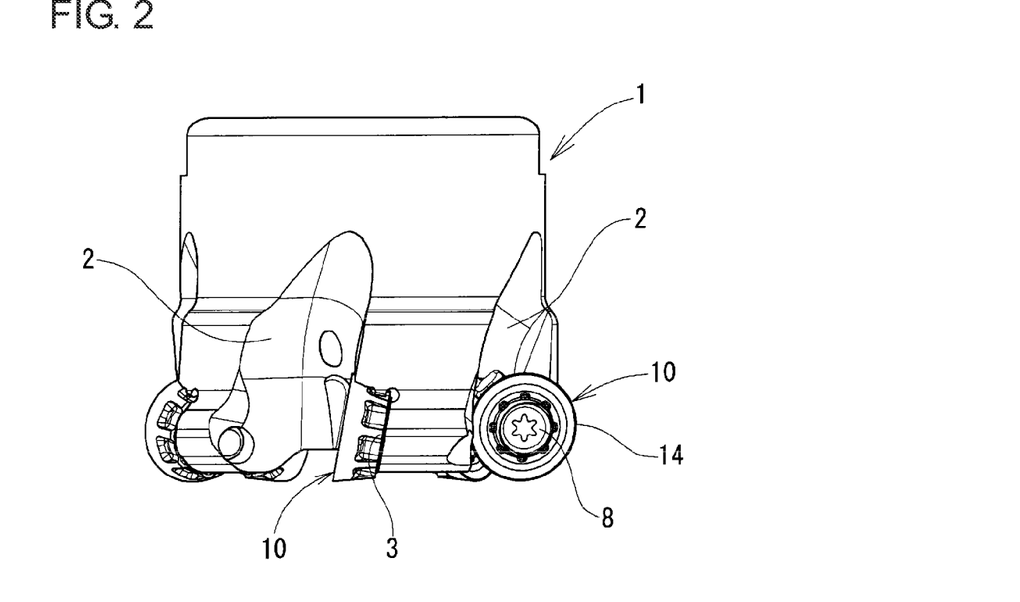
FIG. 2 is a side view of the cutting tool shown in FIG. 1.
Figure 3:
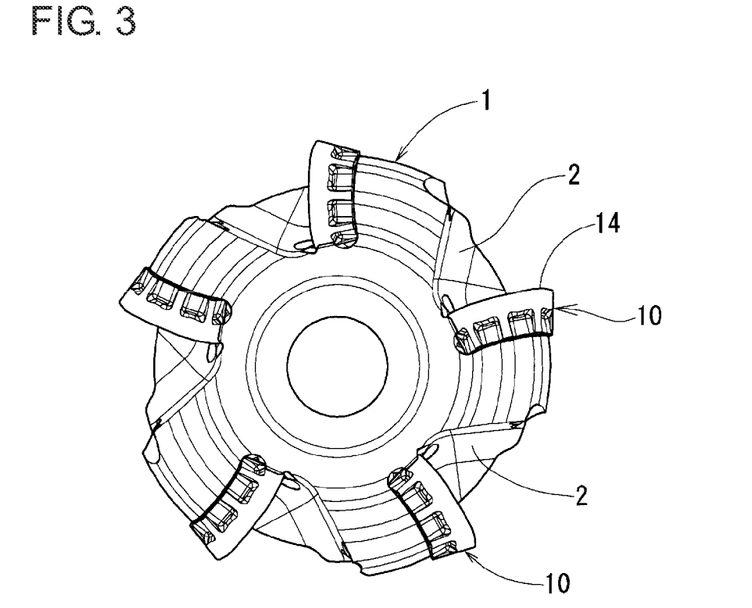
FIG. 3 is a front view of the cutting tool shown in FIG. 1.

FIGS. 1 to 3 schematically show an entire indexable cutting tool according to an embodiment of the present invention. The indexable cutting tool includes a tool body 1, round inserts 10, and clamp screws 8. The round inserts 10 are mounted to the tool body 1. The clamp screws 8 secure the corresponding round inserts 10 to the tool body 1.

Chip pockets 2 and support seats 3 facing the chip pockets 2 are provided at constant pitches in a peripheral direction along a periphery of an end of the tool body 1. Each support seat 3 has a seat bottom surface 3a (see FIGS. 4 and 5) that supports a bottom surface 12 (see FIGS. 8 and 9) of its corresponding round insert 10. Using the clamp screws 8, the round inserts 10 are mounted to the corresponding support seats 3.

The clamp screws 8 are passed through mounting holes 15 (see FIGS. 7, 9, 10, and 12), which are provided in the centers of the corresponding round inserts 10, and are driven into threaded holes 4 (see FIGS. 4 and 5), which are formed in the seat bottom surfaces 3a of the corresponding support seats 3.

Figure 4:
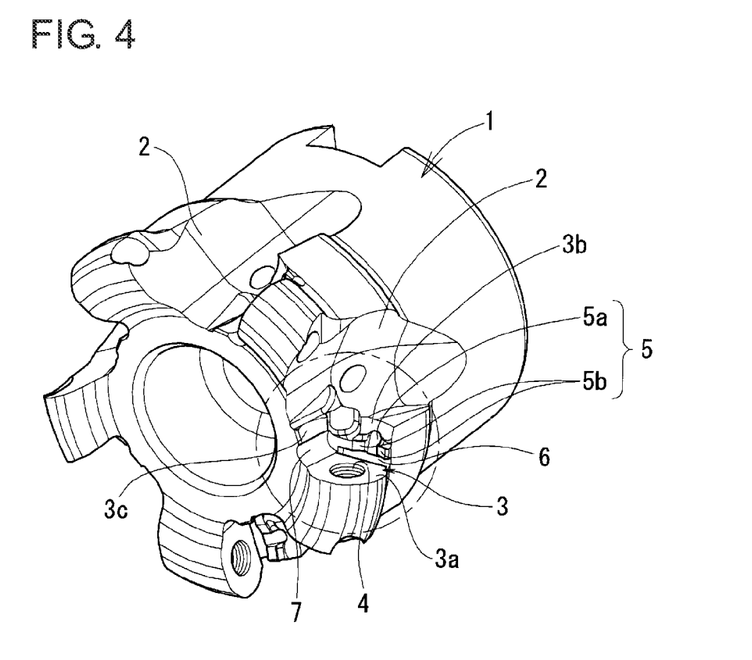
FIG. 4 is a perspective view of a tool body of the cutting tool shown in FIG. 1.
Figure 5:
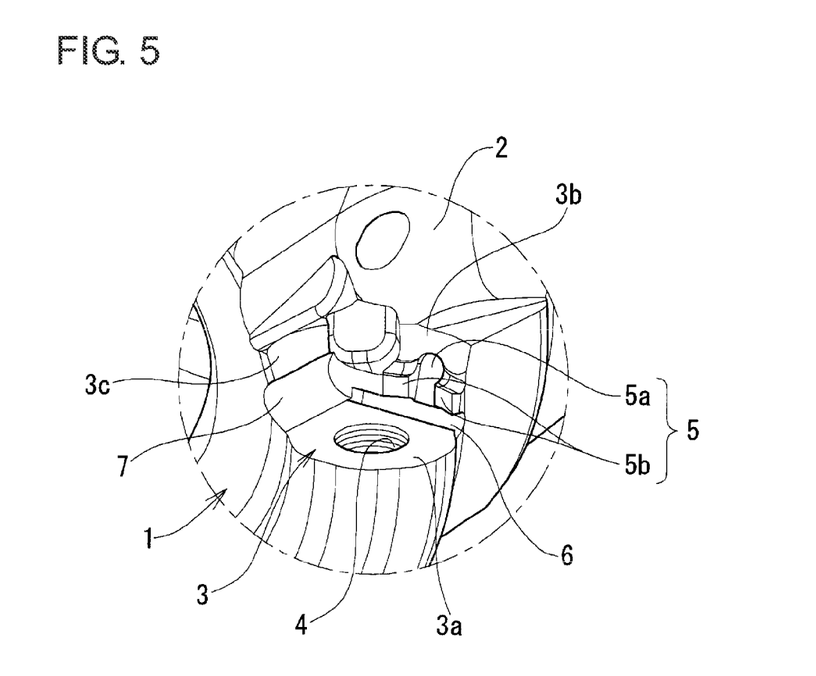
FIG. 5 is a perspective view of a support seat that is provided at the tool body shown in FIG. 4.
Figure 6:
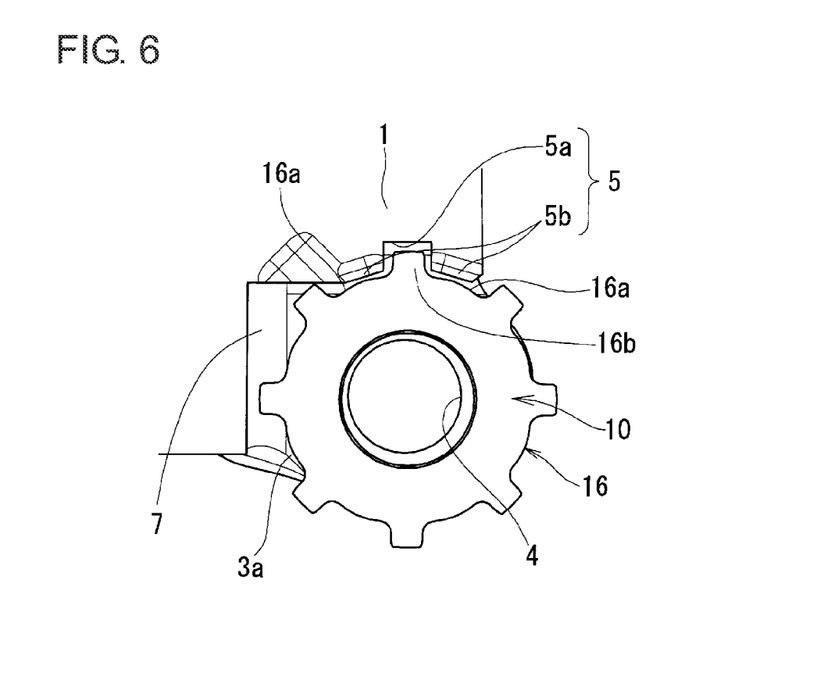
FIG. 6 illustrates the relationship between the position of the support seat of the tool body shown in FIG. 4 and the position of a round insert mounted to the support seat.

Each support seat 3, provided at the periphery of the end of the tool body 1, has, in addition to its corresponding seat bottom surface 3a, a first seat side surface 3b and a second seat side surface 3c shown in FIGS. 4 to 6. Each first seat side surface 3b and each second seat side surface 3c are surfaces that contact side surfaces 13 of its corresponding round insert 10 that are disposed 90 degrees apart from each other. Each first seat side surface 3b positions and supports its corresponding round insert 10 in an axial direction, and each second seat side surface 3c positions and supports the corresponding round insert 10 in a radial direction.

A restraining section 5 including a vertically long restraining flute 5a and protrusions 5b between which the restraining flute is disposed is provided between each seat bottom surface 3a and its corresponding first seat side surface 3b. A first relief portion 6 and a second relief portion 7 that provide relief for a corner of the seat bottom surface 3a at the side of the first seat side surface 3b and a corner of the seat bottom surface 3a at the side of the second seat side surface 3c in a direction away from the round insert are provided at these corners of the corresponding seat bottom surface 3a.

Each restraining flute 5a is a flute whose center is disposed on a line that is parallel to an axis of the tool passing through the center of its corresponding threaded hole 4. The protrusions 5b are disposed on the left and right of the corresponding restraining flute 5a.

A restraining section 5 is not provided at the side of each second seat side surface 3c. This makes it possible to provide a wide region for setting each second relief portion 7.

Each second relief portion 7 is formed in a range from the bottom surface 3a to the second seat side surface 3c of its corresponding support seat 3. Each second relief portion 7 is considerably larger than each first relief portion 6 that is formed in a range to the protrusions 5b from the bottom surface 3a of its corresponding support seat 3.

Although the size of each second relief portion 7 also depends upon the size of its corresponding round insert 10, it is possible to provide each second relief portion 7 in a region whose height is greater than or equal to ½ a height (thickness) H of the corresponding round insert 10. Its size is considerably larger than that in an existing cutting tool of the same type. Therefore, stress that is applied to the corner at the side of each support seat 3 where the second relief portion 7 is provided is reduced by being spread over a wide region. Consequently, fatigue and damage to the tool body caused by repeated application of the stress are effectively suppressed.

Each first relief portion 6 is smaller than each second relief portion 7 since its setting is limited by the protrusions 5b.

However, in the rotating cutting tool, such as a milling cutter, since a large stress, which is applied to the corner at the side of the second seat side surface 3c of each support seat, is not applied to the corner at the side of the first seat side surface 3b of each support seat, problems resulting from the sizes of the first relief portions 6 being small do not particularly occur.

Each round insert 10 is a positive insert in which each side surface 13 intersects its corresponding top surface 11 at an acute angle. Exemplary round inserts 10 are shown in FIGS. 7 to 12.

Figure 7:
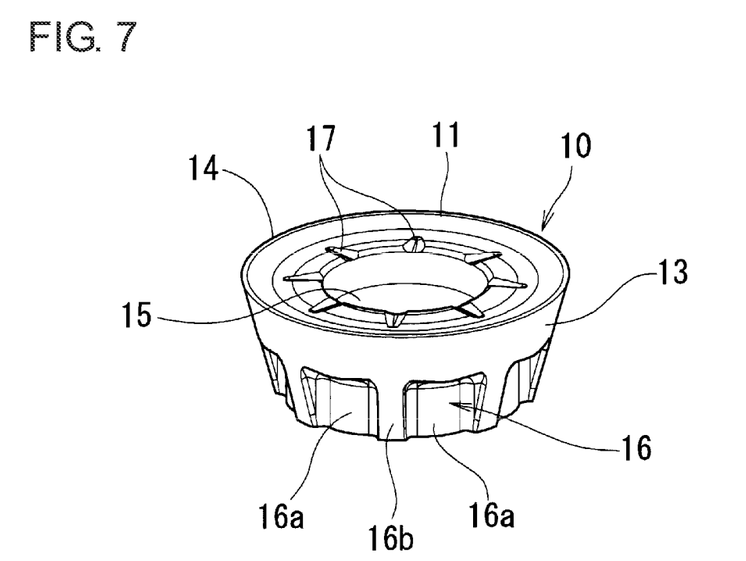
FIG. 7 is a perspective view of the round insert that is used for the cutting tool shown in FIG. 1.
Figure 8:
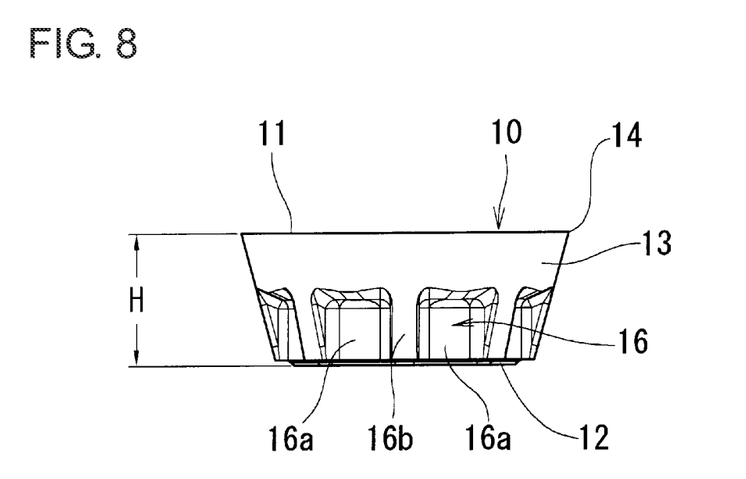
FIG. 8 is a side view of the round insert shown in FIG. 7.
Figure 9:
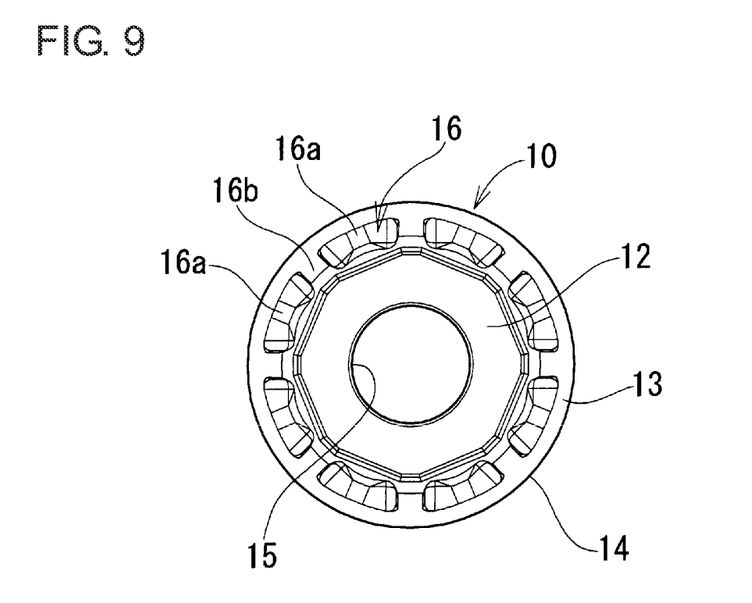
FIG. 9 is a bottom view of the round insert shown in FIG. 7.
Figure 10:
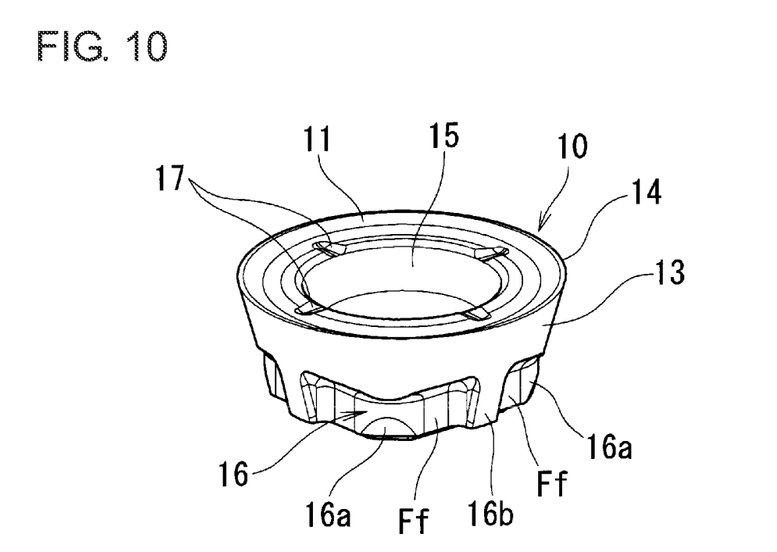
FIG. 10 is a perspective view of another round insert that is used for the cutting tool according to the present invention.
Figure 11:
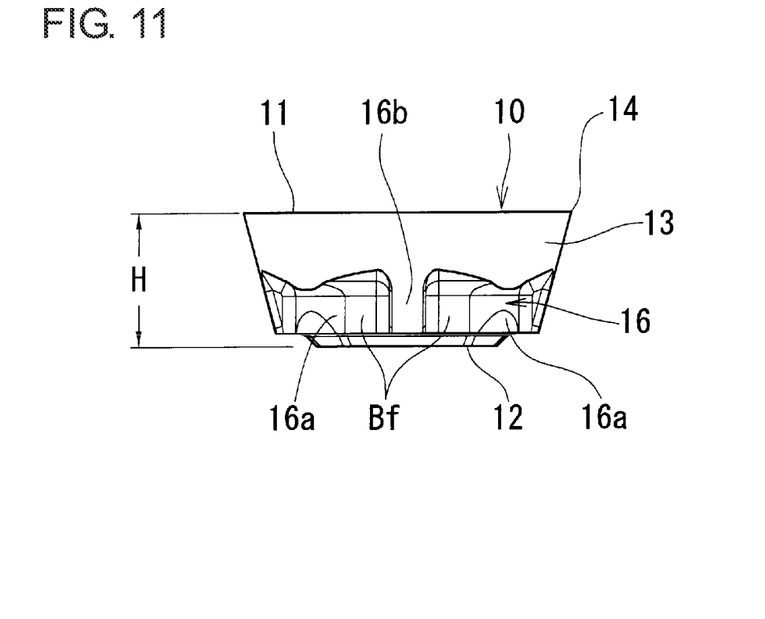
FIG. 11 is a side view of the round insert shown in FIG. 10.
Figure 12:
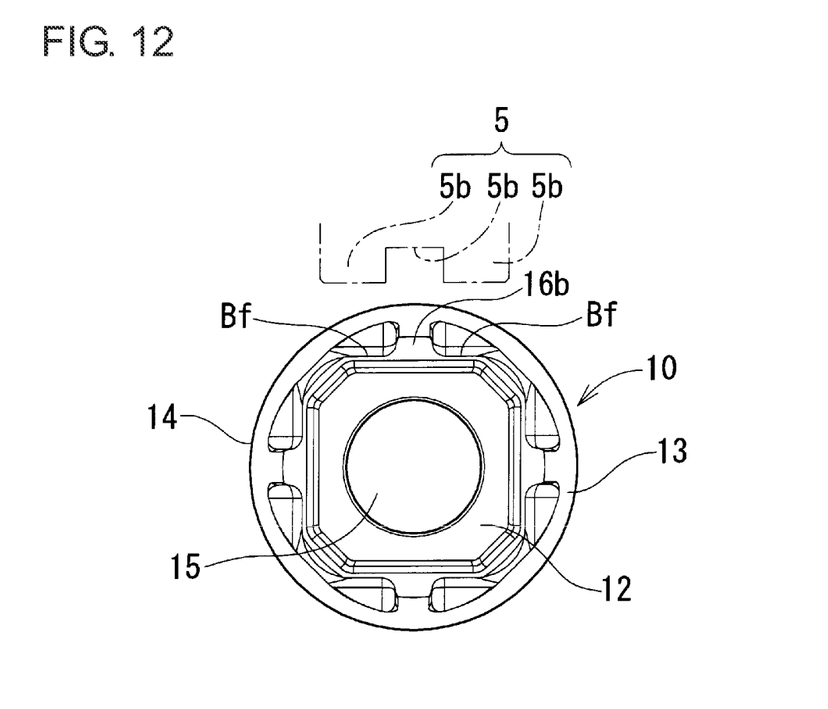
FIG. 12 is a bottom view of the round insert shown in FIG. 10.

An insert of a first form shown in FIGS. 7 to 9 and an insert of a second form shown in FIGS. 10 to 12 are both an indexable type in which a used cutting edge and an unused cutting edge are exchanged by rotation of the insert at a predetermined angle.

The round insert 10 of the first form includes recessed portions 16a and ridges 16b, which are alternately provided at a pitch of 45 degrees in a peripheral direction. Each recessed portion 16a is a depression of a portion of a side surface 13 at a position towards a bottom surface 12 along a periphery. Each ridge 16b has a constant width. A cutting edge 14, formed at a ridge line at a portion where a top surface 11 and the side surface 13 intersect, can undergo rotation (undergo an exchange in position) by rotating the round insert 10 at an indexed angle of 45 degrees using a positioning section 16 including the recessed portions 16a and the ridges 16b.

The round insert 10 of the second form is rotated by 90 degrees to cause a cutting edge 14 to undergo rotation, and includes recessed portions 16a and ridges 16b, which are alternately provided at a pitch of 90 degrees in a peripheral direction. Each recessed portion 16a is a depression of a portion of a side surface 13 at a position towards a bottom surface 12 along a periphery. Each ridge 16b has a constant width.

Side surfaces 13 at the upper side of the round insert 10 that are disposed 90 degrees apart from each other are contacted with a first seat side surface 3b and a second seat side surface 3c, respectively, and positioning in an axial direction is performed by the first seat side surface 3b, and positioning in a radial direction is performed by the second seat side surface 3c, so that the round insert 10 is placed on a support seat 3. At this time, one of the ridges 16b along the periphery of the bottom surface 12 side is inserted into and engaged with a restraining flute 5a formed in the tool body 1, and two protrusions 5b, formed on the tool body 1 so as to be disposed on both sides of the restraining flute 5a, are inserted into the recessed portions 16a on both sides of the ridge 16b inserted in the restraining flute 5a.

In the round insert 10 of the first form, the bottom surface of each recessed portion 16a is a straight cylindrical surface that is concentric with an insert center. In addition, an end of each protrusion 5b, provided on the tool body 1, is tilted from the bottom surface of the corresponding recessed portion 16a in a substantially tangential direction when viewed from an insert end surface in FIG. 6. Therefore, when engagement of the restraining flute 5a and the ridge 16b is no longer hindered, the round insert 10 is prevented from rotating by an engagement portion of the restraining flute 5a and the ridge 16b.

In contrast, in the round insert 10 of the second form, a restraining flat surface Ff is provided at the bottom surface of each recessed portion 16a. In addition, with an end of each protrusion 5b, provided on the tool body 1, having a flat surface that is perpendicular to an axis of the tool, the end of each protrusion 5b engageably faces its corresponding flat surface Ff. The round insert 10 is prevented from rotating even at the location where the ends of the protrusions 5b and the bottom surfaces of the recessed portions 16a engage with each other as well as at the location where the restraining flute 5a and the ridge 16b engage with each other. Therefore, the round insert 10 is more reliably prevented from rotating.

Although the illustrated round insert 10 includes radially disposed flutes 17 in the top surface 11, serving as a rake face, it is not necessary to form the flutes 10. In addition, although the bottom surface 12 is polygonal, it is not necessary for the bottom surface 12 to be polygonal.

REFERENCE SIGNS LIST 1 tool body
2 chip pocket
3 support seat
3a bottom surface
3b first seat side surface
3c second seat side surface
4 threaded hole
5 restraining section
5a restraining flute
5b protrusion
6 first relief portion
7 second relief portion
8 clamp screw
10 round insert
11 top surface
12 bottom surface
13 side surface
14 cutting edge
15 mounting hole
16 positioning section
16a recessed portion
16b ridge
Ff flat surface included at bottom surface of recessed portion
17 flute

The invention claimed is:

1. An indexable cutting tool comprising a positive round insert that is mounted to a support seat provided at a periphery of an end of a tool body,
  wherein a positioning section that positions a cutting edge, used in cutting, at an indexed point is provided at a portion of the round insert towards a bottom surface at a periphery of the round insert,
  wherein the support seat includes a first seat side surface, a second seat side surface, and a restraining section, the first seat side surface and the second seat side surface contacting and supporting side surfaces of the round insert that are disposed 90 degrees apart from each other, the positioning section of the round insert being fitted to the restraining section by bumpy portion fitting,
  wherein only one restraining section is provided between the seat bottom surface and the first seat side surface of the support seat,
  wherein a first relief portion is provided at a corner at a side of the first seat side surface, and a second relief portion that is larger than the first relief portion is provided at a corner at a side of the second seat side surface, and
  wherein, in a view perpendicular to a threaded hole formed in the seat bottom surface, the first relief portion has a first radius and the second relief portion has a second radius, and the second radius is larger than the first radius.

2. The indexable cutting tool according to claim 1, wherein the positioning section of the round insert includes recessed portions and ridges, which are alternately provided at a constant pitch in a peripheral direction at portions of the side surfaces towards the bottom surface of the round insert, each ridge having a constant width, and wherein the restraining section of the support seat include a restraining flute and protrusions, the ridge engaging the restraining flute, the protrusions entering the recesses on two sides of the ridge.

3. The indexable cutting tool according to claim 1, wherein the second relief portion is formed in a range from the seat bottom surface to the second seat side surface of the support seat.

4. The indexable cutting tool according to claim 2, wherein the end of each protrusion, provided at the tool body, engageably faces a bottom of the corresponding recessed portion, provided in the round insert, and wherein the round insert is prevented from rotating at a location where the restraining flute and the ridge engage with each other and at a location where the end of each protrusion and the bottom of the corresponding recessed portion engage with each other.

5. The indexable cutting tool according to claim 1, wherein the first seat side surface and the second seat side surface are positioned concentrically with regard to a center of the round insert.

\* \* \* \* \*